Sept. 2, 1924. 1,507,319
C. L. LEE
TOOL
Filed April 17, 1922  2 Sheets-Sheet 1

Sept. 2, 1924.　　　　　　　　　　　　　　　　　　1,507,319
C. L. LEE
TOOL
Filed April 17, 1922　　2 Sheets-Sheet 2

Witness.　　　　　　　　　　　　　　　　Inventor.
Wm. T. Pasco.　　　　　　　　　　　　　Charles L. Lee.
Geo. C. Pasco.　　By　　　　　　　　Francis D. Hardesty
　　　　　　　　　　　　　　　　　　　　　Attorney.

Patented Sept. 2, 1924.

1,507,319

UNITED STATES PATENT OFFICE.

CHARLES L. LEE, OF DAYTON, OHIO, ASSIGNOR TO GENERAL MOTORS RESEARCH CORPORATION, OF DAYTON, OHIO, A CORPORATION OF DELAWARE.

TOOL.

Application filed April 17, 1922. Serial No. 553,963.

*To all whom it may concern:*

Be it known that I, CHARLES L. LEE, a citizen of the United States of America, residing at Dayton, county of Montgomery, and State of Ohio, have invented certain new and useful Improvements in Tools, of which the following is a full, clear, and exact description.

This invention relates to a tool for twisting together (or untwisting) the ends of a wire or wires and thereby making a splice between such ends. It is especially adapted for use in making wire hoops or in binding wire tightly about barrels, boxes, etc., since the ends of the wire may be drawn tight and twisted together by means of this tool without releasing the original grip on the wire ends. This invention is further characterized by having individual gripping means for each wire end which enables the tool to grip different size wires at the same time, and in any case to render the gripping action much more certain.

Further objects and advantages of this invention will appear hereinafter as I proceed with a more detailed description of the particular form of embodiment of the invention which for the purposes of illustration I have shown in the accompanying drawings, in which Fig. 1 is a view showing the manner of using the tool in binding a wire about a cylindrical form;

Similar reference characters refer to similar parts throughout the several views of the drawings.

Figure 1:
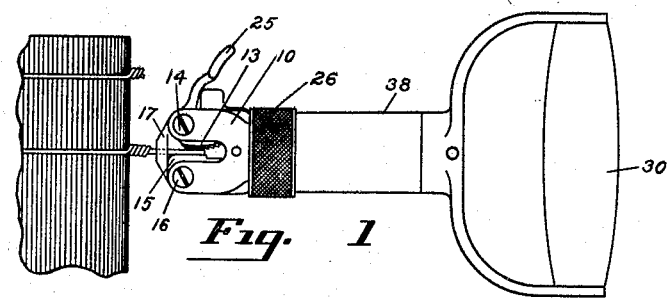
Figure 2:
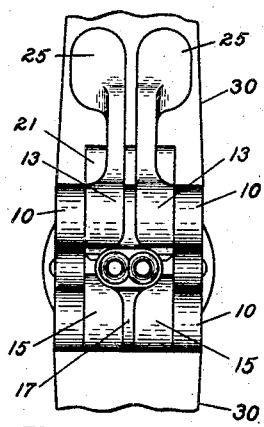
Fig. 2 is a front end view on an enlarged scale.
Figure 3:
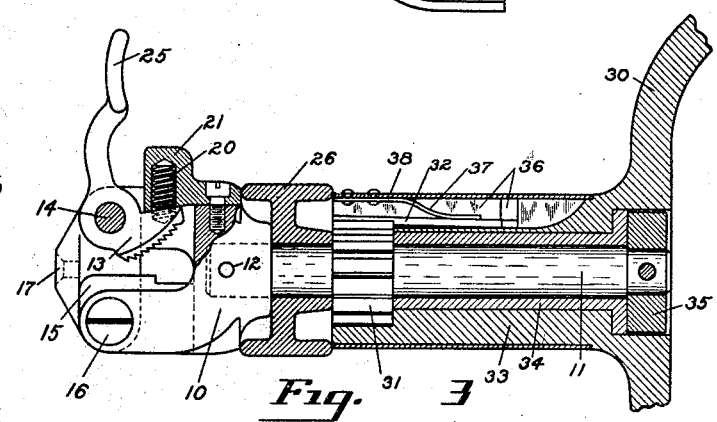
Fig. 3 is a section on line 3—3 of Fig. 5.
Figure 4:
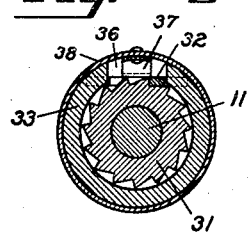
Fig. 4 is a section on line 4—4 of Fig. 5.
Figure 5:
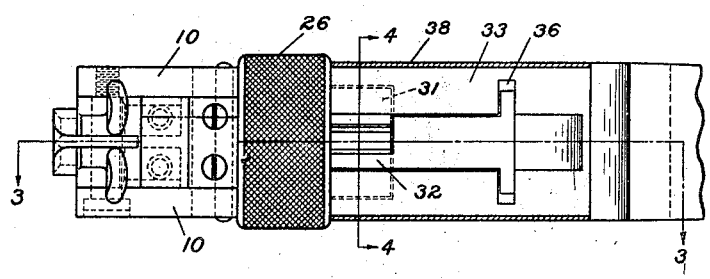
Fig. 5 is a top view with a part in section to show the pawl and ratchet construction.

The jaw holder or head 10 is rigidly attached to its shank 11 by means of the pin 12 or by any other suitable means. This jaw holder 10 has two movable upper gripping jaws 13 which are pivoted upon the pin 14 as clearly shown. The two lower jaws are held rigidly in the jaw holder 10 by means of the pin or bolt 16. A wire guide 17 is also rigidly attached to the jaw holder 10 by means of the pins or bolts 14 and 16. The upper jaws 13 are normally held pressed down by the compression springs 20, the spring holder 21 also serving as a stop for the open position of the jaws as shown in Fig. 3, and for the lowermost closed position of the jaws by striking the thumb levers 25 which are integral with the jaws 13.

A knurled sleeve 26 runs loosely upon the shank 11, this sleeve 26 serving as a stationary support by which the tool may be held in the hand when the tool is rotated.

A handle 30 is arranged to drive the shank 11 by means of an over-running clutch means, which in the form illustrated, comprises the ratchet 31 which is fixed to shank 11 and the pawl 32 which is mounted upon the handle 30. The handle 30 is provided with an integral sleeve 33 which runs upon a bushing 34 on the shank 11 and is retained thereupon by a collar 35. The sleeve 33 is provided with a T-shaped slot 36 upon the bottom of which the pawl 32 rests. The pawl is held in yieldable contact with the ratchet 31 by means of the spring 37 which is rigidly attached to the spring retainer sleeve 38 by any suitable means.

In the operation of the device the projecting wire ends which are to be twisted together are inserted into the holes in the guide 17. When the wire ends strike the upper jaws 13 the jaws swing upward sufficiently to permit the wires to pass inwardly but swing downward and firmly grip the wires between the upper and lower jaws if they tend to move outwardly. Then by supporting the tool by grasping the loose sleeve 26 in one hand the handle 30 is rotated back and forth with the other hand. By means of the pawl and ratchet drive between the handle 30 and shank 11 the head 10 is rotated only for one direction of rotation of the handle. When the wires have been twisted the desired amount the ends may be released by pressing upon the thumb levers 25.

If desired, a modified form of driving mechanism between the handle 30 and head 10 may be employed embodying the principle of a spiral drive such as that commonly known as the Yankee drill. If such a driver is used the ratchet should be so arranged as to permit a pulling motion on the handle 30 to cause a rotation of the head 10, since the idea of the tool is to pull the wire tight while twisting.

Figure 6:
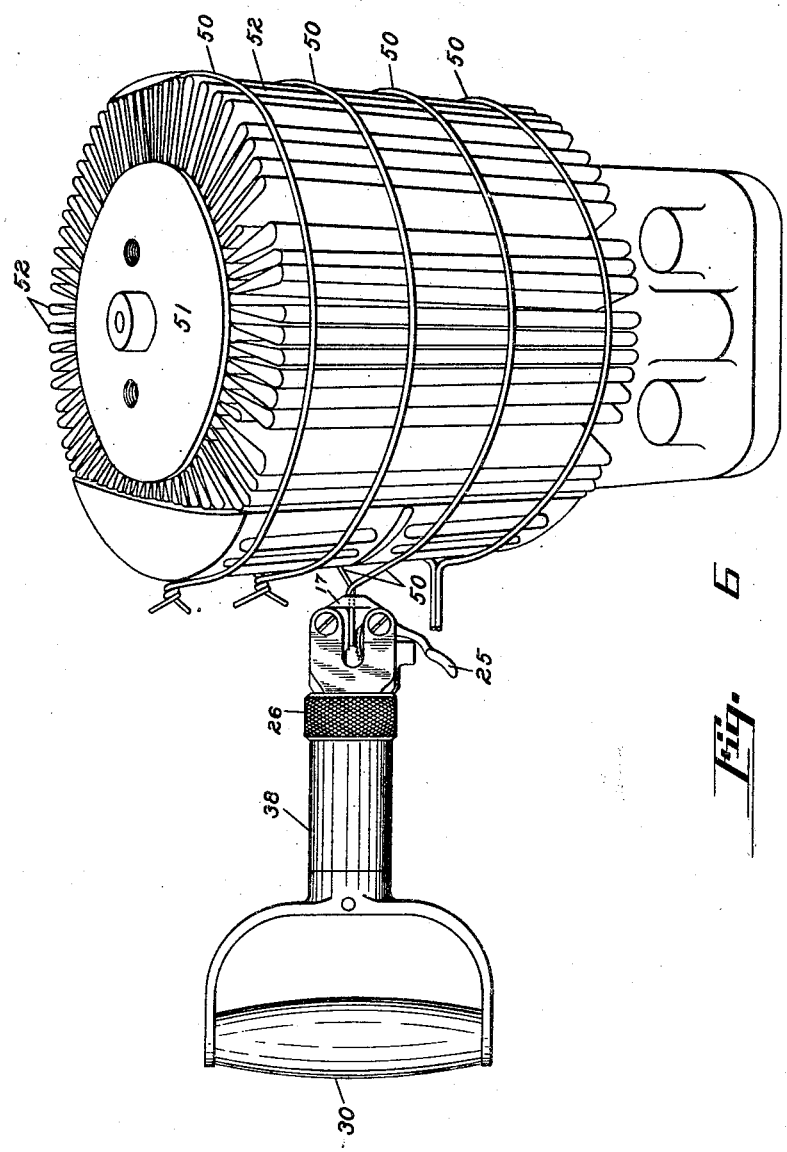
Fig. 6 is a view showing the manner of using the tool to pull tight and twist wires for binding sheet metal cooling fins on an internal-combustion engine preparatory to brazing or soldering the fins to the cylinder.

Fig. 6 illustrates the tool being used to pull the binding wires 50 tight by pulling on the handle 30 before and during the twisting of the ends together. 51 is a cylinder for an internal-combustion engine to which it is desired to fasten the cooling fins 52 which are formed from a strip of sheet metal. The fins 52 are securely bound to the cylinder 51 by means of the wires 50 so they will be held in tight contact with the cylinder during a brazing or soldering process. By means of this invention the wires 50 may have a great tension put upon them by direct pulling on the tool both before and during the twisting of the ends together and hence a tight contact between the fins and the cylinder is obtained and a better brazing or soldering job is assured.

While the form of mechanism herein shown and described, constitutes a preferred form of embodiment of the present invention, it is to be understood that other forms might be adopted, all coming within the scope of the claims which follow.

What I claim is as follows:

1. A tool for twisting or untwisting wire ends, comprising means for gripping the wire ends, said means having a shank rigidly connected thereto and carrying a ratchet, a sleeve loosely mounted upon said shank to enable support and guidance of the tool, a handle for rotating said shank and revolubly mounted thereon, a sleeve attached to said handle and enclosing said shank and its ratchet, and pawl mechanism within the last-mentioned sleeve adapted to coact with said ratchet to prevent rotation of the handle in but one direction.

2. A tool for twisting or untwisting wire ends comprising in combination: spring jaw gripping means for seizing the loose wire ends and holding said ends relatively stationary, an operating handle for rotating said means, and a housing forming part of said handle, said housing enclosing over-running clutch driving means between the handle and gripping means whereby the gripping means may be rotated in only one direction when the handle is rotated back and forth.

3. A tool for twisting or untwisting a plurality of wire ends comprising in combination: a head, individual means for gripping each wire end and holding said ends relatively stationary in the common head, an operating handle for rotating the head, and a housing forming part of said handle, said housing enclosing an over-running clutch means between the handle and head whereby the head may be rotated in only one direction when the handle is rotated back and forth.

In testimony whereof I hereto affix my signature.

CHARLES L. LEE.

Witnesses:
 GEO. E. PASCO,
 WM. P. PASCO.